(12) United States Patent
Kakigi

(10) Patent No.: US 8,368,910 B2
(45) Date of Patent: Feb. 5, 2013

(54) PRINTING APPARATUS AND METHOD

(75) Inventor: Nobuyoshi Kakigi, Yokohama (JP)

(73) Assignee: Canon Kabushiki Kaisha (JP)

(*) Notice: Subject to any disclaimer, the term of this patent is extended or adjusted under 35 U.S.C. 154(b) by 1075 days.

(21) Appl. No.: 11/186,267

(22) Filed: Jul. 21, 2005

(65) Prior Publication Data

US 2006/0017960 A1  Jan. 26, 2006

(30) Foreign Application Priority Data

Jul. 23, 2004 (JP) ................................. 2004-216249

(51) Int. Cl.
*G06K 15/00* (2006.01)

(52) U.S. Cl. ...... 358/1.14; 358/1.15; 358/437; 358/468; 399/16; 399/405

(58) Field of Classification Search ............. 358/1.9, 358/1.13, 1.14, 1.15, 1.16, 437, 468; 399/16; 405/405

See application file for complete search history.

(56) References Cited

U.S. PATENT DOCUMENTS

| | | | | |
|---|---|---|---|---|
| 5,982,994 A | * | 11/1999 | Mori et al. | 358/1.15 |
| 6,246,491 B1 | * | 6/2001 | Matsumoto et al. | 358/468 |
| 7,253,920 B2 | * | 8/2007 | Hosoda | 358/1.9 |
| 7,298,505 B2 | * | 11/2007 | Ueda | 358/1.14 |
| 7,333,230 B2 | * | 2/2008 | Sugishita et al. | 358/1.15 |

FOREIGN PATENT DOCUMENTS

| | | |
|---|---|---|
| JP | 6303362 A | 10/1998 |
| JP | 11-091210 | 4/1999 |
| JP | 11-353137 | 12/1999 |
| JP | 2000118857 A | 4/2000 |
| JP | 2000141826 A | 5/2000 |
| JP | 2000-222150 | 8/2000 |
| JP | 2001-039608 | 2/2001 |
| JP | 2003-118209 | 4/2003 |
| JP | 2003-330650 A | 11/2003 |

* cited by examiner

*Primary Examiner* — Vu Hang

(74) *Attorney, Agent, or Firm* — Rossi, Kimms & McDowell LLP

(57) ABSTRACT

A printing system comprises a host computer, a laser printer of a paper ejecting type and another laser printer of a non-paper ejecting type, all connected to one another via a system bus. The host computer functions as the supply source of image information and as the data processor, and controls the laser printer of a paper ejecting type and the other laser printer of a non-paper ejecting type. A printing apparatus and method that can contribute to increasing the speed and convenience of secured print in this printing system are to be provided. To accomplish this, the laser printer of a paper ejecting type and the other laser printer of a non-paper ejecting type will execute interrupt print processing when the received job is a secured print job and there is any other job being processed if there are a plurality of paper discharging ports or execute promote print processing if there is only one paper discharging port.

15 Claims, 11 Drawing Sheets

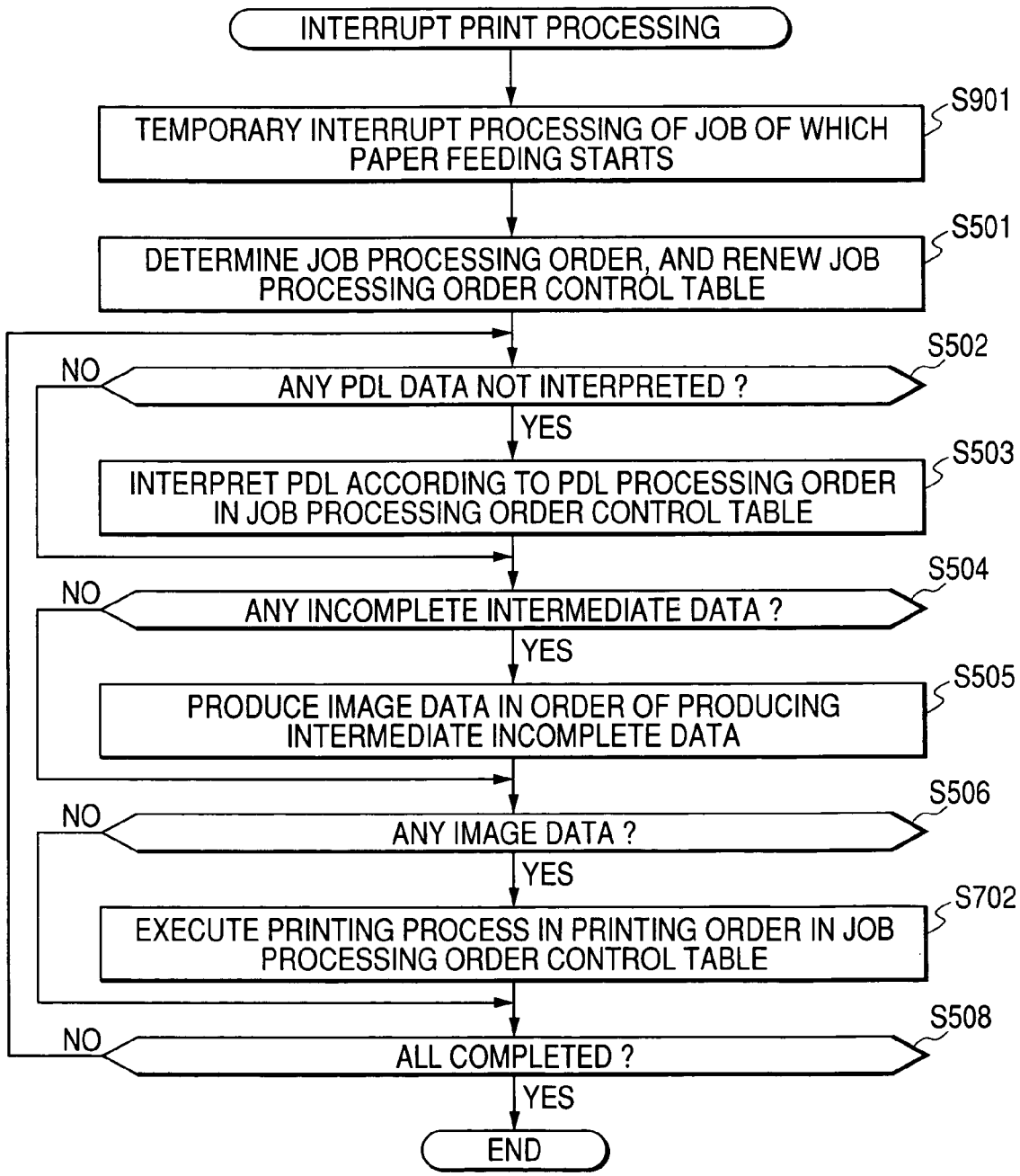

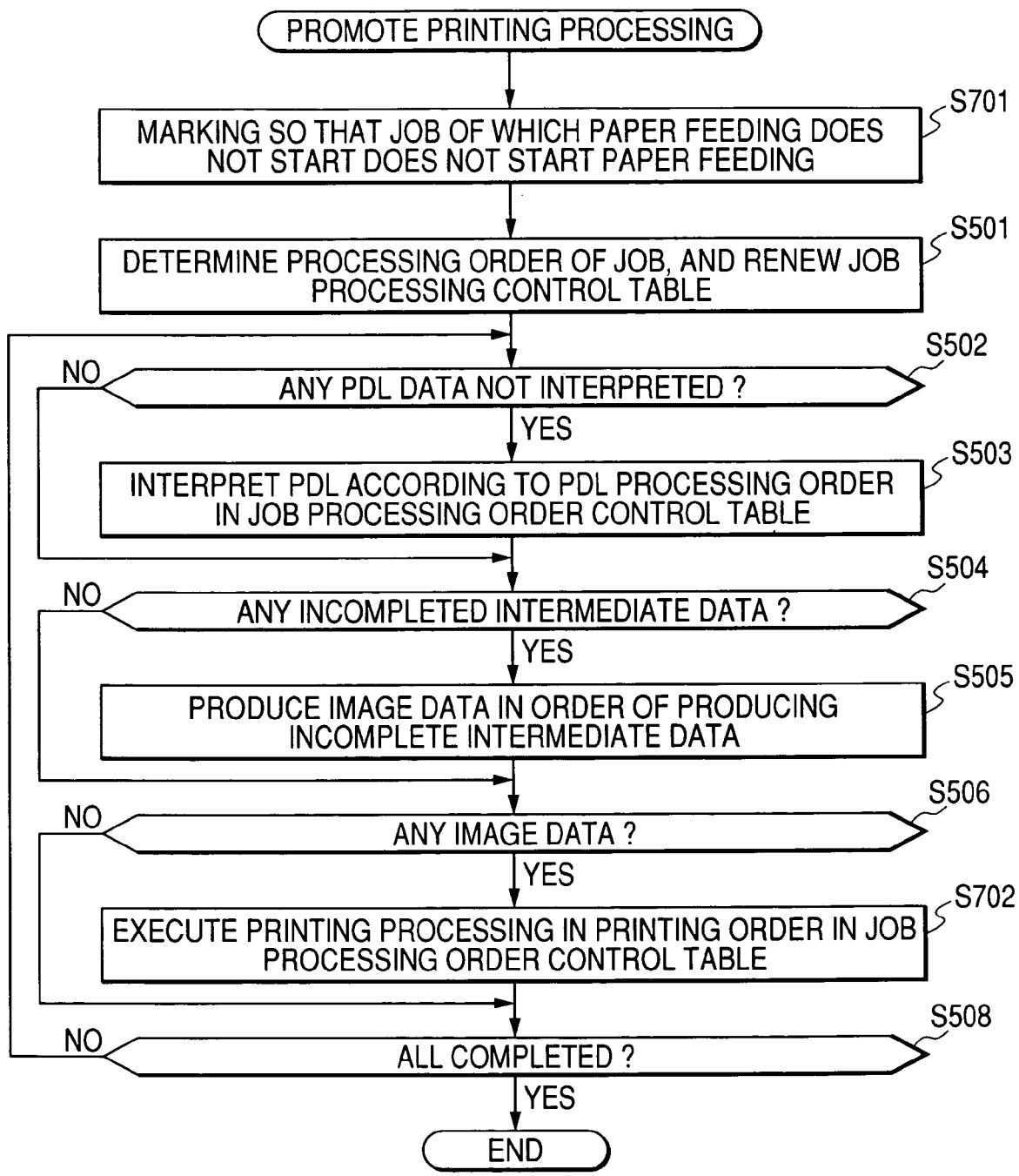

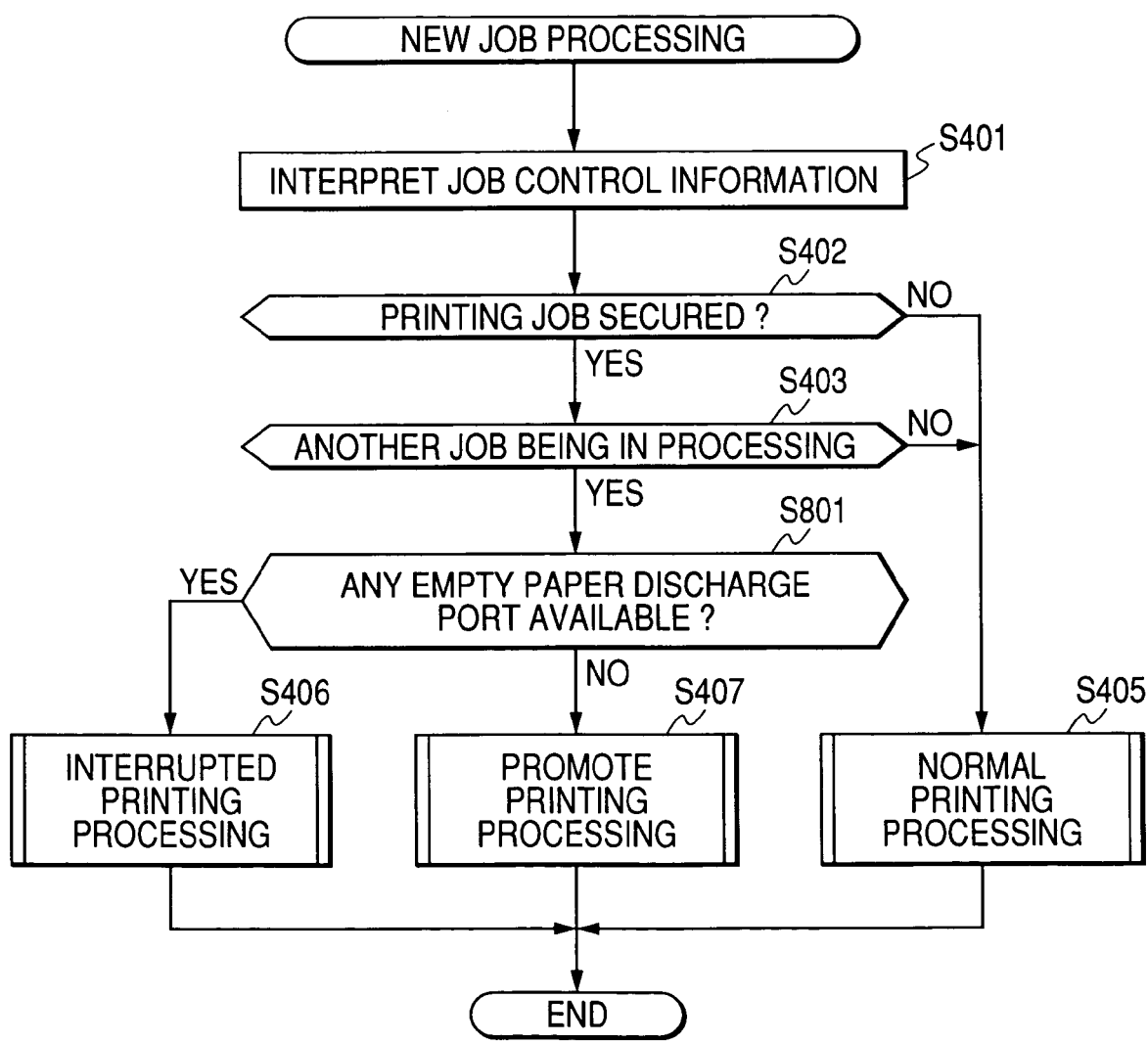

FIG. 10A

JOB PROCESSING CONTROL TABLE

| PROCESSING ORDER | PDL PROCESSING | PRINTING PROCESSING |
|---|---|---|
| 1 | JOB 3 | JOB 3 |
| 2 | JOB 1 | JOB 1 |
| 3 | JOB 2 | JOB 2 |
| 4 | JOB 4 | JOB 4 |
| 5 | JOB 5 | JOB 5 |

JOB PROCESSING CONTROL TABLE

| PROCESSING ORDER | PDL PROCESSING | PRINTING PROCESSING |
|---|---|---|
| 1 | JOB 1 | JOB 3 |
| 2 | JOB 2 | JOB 1 |
| 3 | JOB 3 | JOB 2 |
| 4 | JOB 4 | JOB 4 |
| 5 | JOB 5 | JOB 5 |

⋮

PRINTING APPARATUS AND METHOD

BACKGROUND OF THE INVENTION

1. Field of the Invention

The present invention relates to a printing apparatus and method, and more particularly, to a printing apparatus and method having a security function involving user authorization by means of a password or the like.

2. Background of the Invention

Along with the advance of networking technology over the recent years, network-compatible printing apparatuses including printers, facsimiles and copying machines have come into practical use, and printing systems in which these printing apparatuses are connected to a network to enable many users to share a small number of printing apparatuses for printing purposes are coming into extensive use.

On the other hand, as the documents to be printed may contain such items of confidential information as information on personnel administration and personal information, the following two techniques, for example, are proposed to make possible secured print, which would prevent other parties from seeing the contents of printed matters in an environment of sharing printing apparatuses.

As one of these examples, Japanese Patent Application Laid-Open No. 2000-222150 proposes a printing system consisting of a host computer and printing apparatuses both connected to a network, wherein, when secured print is to be done, a printing job to which a password is added is transmitted to a printing apparatus, the password is also recorded on a floppy disk, and password collation is done via the floppy disk inserted into the printing apparatus to realize secured print. As another example, Japanese Patent Application Laid-Open No. 2001-039608 proposes a printing apparatus having an intermediate tray for stapling use, which realizes secured print in a simple way by temporarily storing printed sheets in the intermediate tray even if no stapling instruction is given, and ejecting the bundles of printing jobs to a paper discharging tray at once when all the jobs have been completed, thereby making it possible to keep the contents of the printed matters invisible until the printing is wholly completed.

However, both examples of the related art described above concern the mechanism of secured print itself, but neither makes any reference to the handling of a plurality of jobs. In the operation of secured print in a real office environment, since a plurality of users share the same printing apparatus for their common use, even if one of them tries to operate secured print for a confidential document, the printing apparatus may often be used for printing another document, and in such a case this user would have to wait in front of the printing apparatus until that printing job of somebody else is finished. Furthermore, during an operation to execute secured print such as undoing the restriction by the password, the job of someone else may be received.

Since secured print, very because of its nature, is an act that is done when the product of printing should not be seen by any unauthorized person, the user intending to do it has to wait in front of the printing apparatus, and in some cases he may have to wait in front of the printing apparatus until both the other person's printing job and his own secured print job end.

Further, the greater the number of persons sharing a printing apparatus, the more probable the printing apparatus is in operation, and to avoid this situation, the user has to execute secured print after confirming that the printing apparatus is not in printing operation; this circumstance makes secured print practically inconvenient in a usual office environment in which each printing apparatus is shared by a plurality of users.

In order to fundamentally solve these problems, the only available solution is to install an additional printing apparatus or apparatuses and reduce the utilization rate of each printing apparatus, but this is too costly a proposition to be realistic.

Thus, Japanese Patent Application Laid-Open No. 2000-222150 and Japanese Patent Application Laid-Open No. 2001-039608 cited above take no heed of the mutual problems which are likely to occur among a plurality of users sharing one printing apparatus, and cannot contribute to increasing the convenience of secured print in an existing printing system built up in a usual office environment.

SUMMARY OF THE INVENTION

Accordingly, an object of the present invent is to provide a printing apparatus and method that enable secured print to be increased in both speed and convenience.

According to the invention, the foregoing object is attained by providing a printing apparatus capable of secured print, comprising a unit adapted to determine the order of processing a plurality of printing jobs; a unit adapted to control printing for altering the determined order of print processing; and a unit adapted to discriminate the type of printing for determining whether or not the printing job is to be processed by secured print, wherein the unit adapted to control printing gives priority to the position of the printing job to be processed by secured print in the order of print processing over other printing jobs than the printing job to be processed by secured print.

Other features and advantages of the present invention will be apparent from the following description taken in conjunction with the accompanying drawings, in which like reference characters designate the same or similar parts throughout the figures there.

BRIEF DESCRIPTION OF THE DRAWINGS

FIG. 7 is a flow chart of a variation of the interrupt print processing charted in FIG. 6;

FIG. 8 is a flow chart of promote print processing executed at step S407 in FIG. 4;

FIG. 9 is a flow chart of a variation of the interrupt print processing charted in FIG. 4

FIGS. 10A and 10B are used for describing job processing control tables.

DESCRIPTION OF THE PREFERRED EMBODIMENTS

A preferred embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
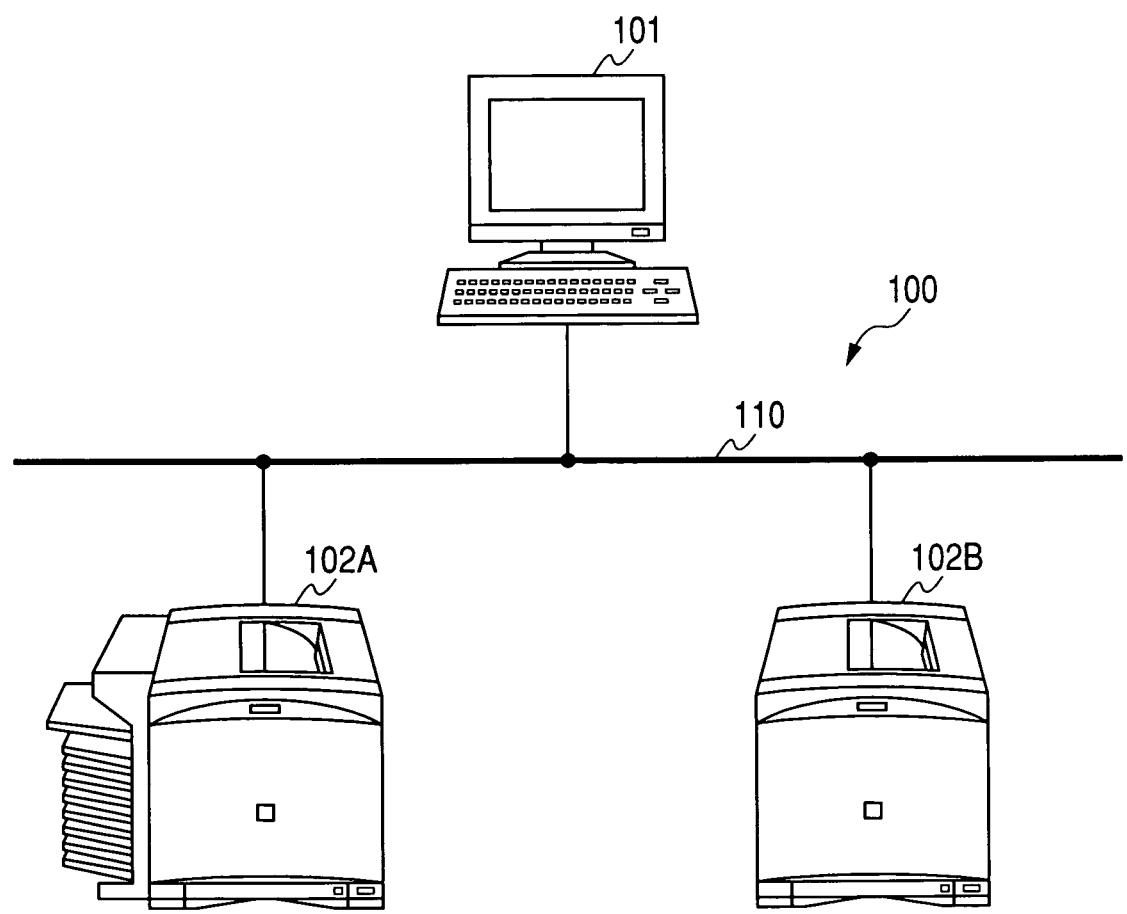
FIG. 1 schematically shows the configuration of a printing system including a printing apparatus, which is a preferred embodiment of the present invention.

FIG. 1 schematically shows the configuration of a printing system including a printing apparatus, which is a preferred embodiment of the present invention.

Referring to FIG. 1, a printing system 100 including a printing apparatus embodying the invention comprises a host computer 101, a laser printer 102A allowing options for paper ejection and a laser printer 102B allowing no such option, the computer and the printers being connected to each other via a system bus 110. The host computer 101, functioning as the supply source of image information and as the data processor, controls the laser printers 102A and 102B.

The printer 102A has a plurality of paper discharging bins for sorting, dividing paper sheets according to the user and stacking a large number of pages among other functions. On the other hand, the printer 102B has only one paper discharging port in its body, and ejects every printing job through the paper discharging port in the upper part of its body.

Figure 2:
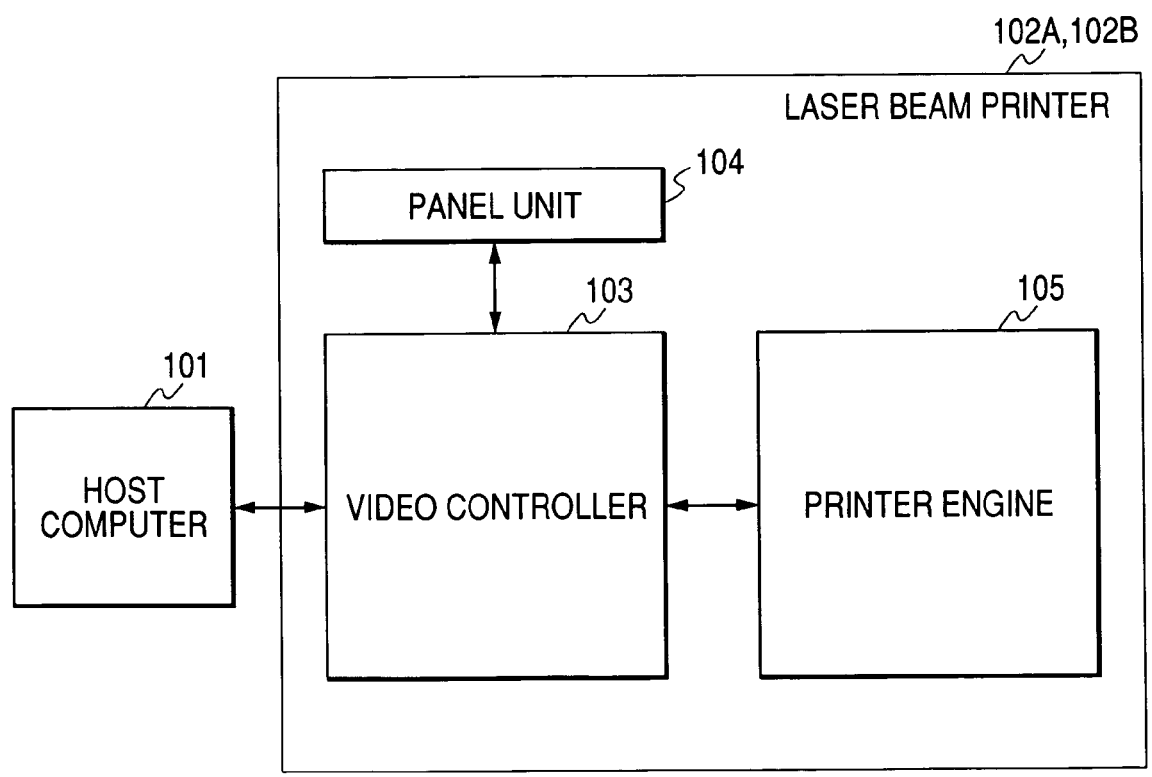
FIG. 2 is a block diagram showing the system configuration of the laser beam printers in FIG. 1.

FIG. 2 is a block diagram showing the system configuration of the laser printers 102A and 102B in FIG. 1.

Referring to FIG. 2, each of the laser printers 102A and 102B comprises a video controller 103, shown in FIG. 3 to be referred to below, connected to the host computer 101, a panel unit 104 and a printer engine 105, both connected to the video controller 103.

The video controller 103 generates raster data for each page on the basis of image information (e.g. ESC codes, page description language and so on) supplied from the host computer 101, and delivers them to the printer engine 105.

The printer engine 105 forms a latent image on a photosensitive drum on the basis of the raster data supplied from the video controller 103, and records an image by transferring and fixing that latent image onto a recording medium (electrophotographic system).

The panel unit 104 is used as the user interface. By manipulating the panel unit 104, the user can instruct a desired action. The user inputs a password via this panel unit 104 to start the action to perform a secured print job. The panel unit 104 displays the contents of processing by the laser beam printers 102 and alarms to the user, and its display is turned off when it is in the power saving mode.

Figure 3:
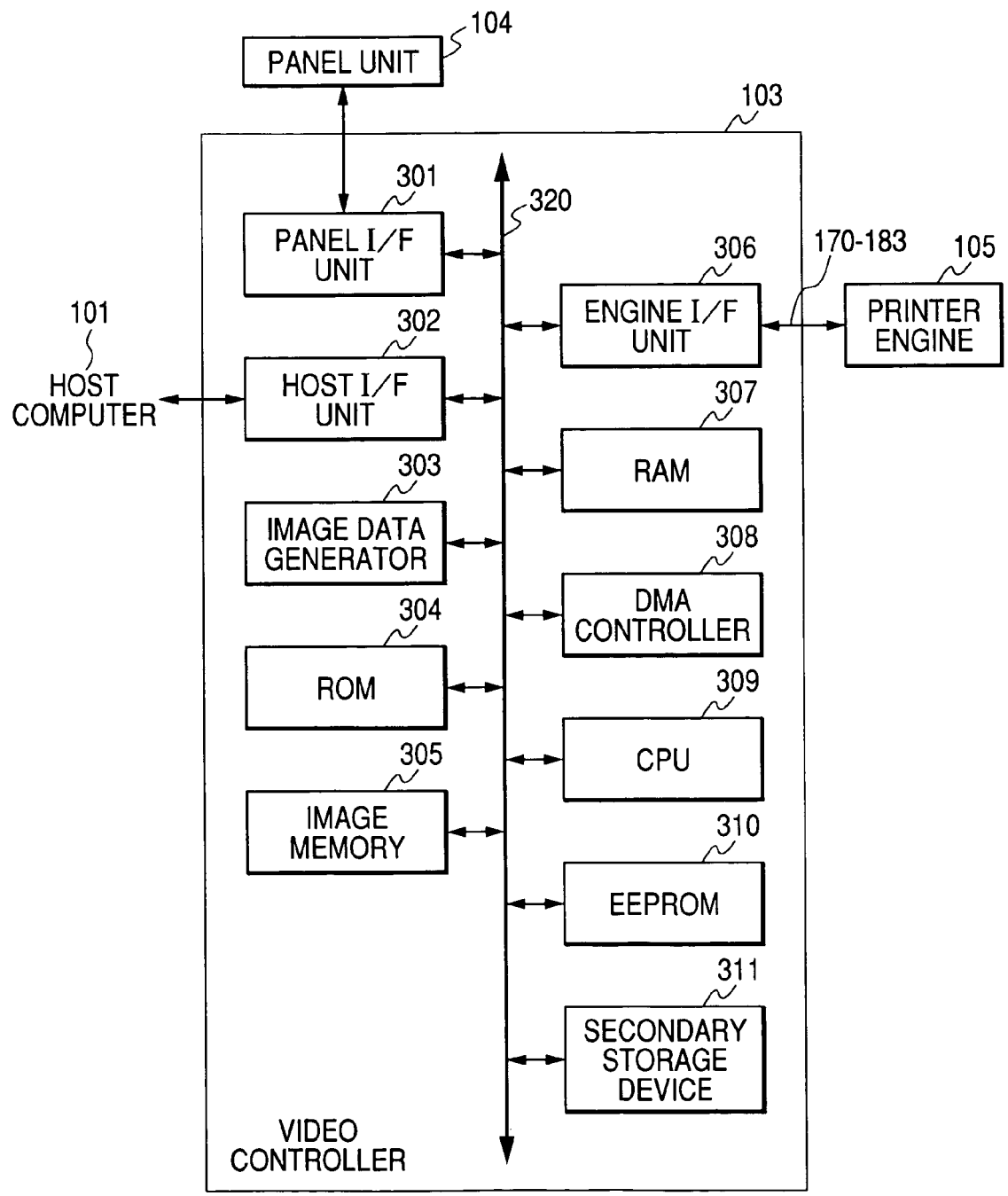
FIG. 3 is a block diagram schematically showing the configuration of the video controller in FIG. 2.

FIG. 3 is a block diagram schematically showing the configuration of the video controller 103 in FIG. 2.

The video controller 103 shown in more detail in FIG. 3 comprises a panel I/F unit 301 connected to the panel unit 104, a host I/F unit 302 connected to the host computer 101, an image data generator 303, a ROM 304, an image memory 305, an engine I/F unit 306 connected to the printer engine 105, a RAM 307, a DMA controller 308, a CPU 309, an EEPROM 310 and a secondary storage device 311, and they are connected to one another via a system bus 320.

Referring to FIG. 3, the panel I/F (interface) unit 301 performs data communication with the panel unit 104. The CPU 309 can confirm via the panel I/F unit 301 the contents of setting and instructions given by the user on the panel unit 104. The host I/F unit 302 connects to the host computer 101 for interactive communication via a network. The engine I/F unit 306 connects to the printer engine 105 for communication. The CPU 309 controls signals 170, 173, 175, 178, 179 and 180, and can perceive the states of signals 171, 172, 174, 176, 177, 181 and 182, namely the state of the printer engine 105 via the engine I/F unit 306.

The image data generator 303 rasterizes data to be supplied to the printer engine 105 on the basis of image information supplied from the host computer 101. The image memory 305 temporarily holds the generated raster data. The CPU 309 controls devices connected to a CPU bus 320 in accordance with control program codes held by the ROM 304. The RAM 307, which is a memory for temporary storage for use by the CPU 309, is so configured as to allow its capacity expansion with an optional RAM to be connected to an additional port (not shown). The RAM 307 is used as a plotted object storage device (not shown) for storing plotted objects, a work memory for temporary use by a control program held by the ROM 304 and other purposes. The EEPROM (electrical erasable and programmable ROM) 310 consists of, for instance, a nonvolatile memory for holding control information, such as a density correction table. The DMA controller 308 transfers raster data in the image memory 305 to the engine I/F unit 306 at an instruction from the CPU 309. The secondary storage device 311, consisting of a hard disk or the like, stores print data and other items of control information.

The system bus 320 includes address, data and control buses. The panel I/F unit 301, the host I/F unit 302, the image data generator 303, the ROM 304, the image memory 305, the engine I/F unit 306, the RAM 307, the DMA (direct memory access) controller 308, the CPU 309, the EEPROM 310 and the secondary storage device 311 can individually access every device via the system bus 320.

A typical sequence of secured print in such an environment would run in the following way.

When transmitting a job created on the host computer to the printer 102A or the printer 102B, secured print is designated. In this procedure, the user designates a password as the key in taking out that job from the printer. The printer having received a secured print-designated job holds that job either intact as the received PDL (page description language) data or in a state of having been converted into an image. The user having designated the job as secured print, when wishing to take out that job, selects from the panel unit 104 of the printer the job he transmitted, and executes printing by inputting the password. A case will be described below in which the actions differ according to, for instance, whether the secured print job is transmitted to the printer 102A or to the printer 102B in this executing procedure.

Since the printer 102A has a plurality of paper discharging bins, it is possible to switch over to a different paper discharging bin for each user and accordingly to prevent the jobs of a plurality of users from being mixed up, and it is easy, even if an earlier job already being printed is suspended, to distinguish a secured print job and the previous job from each other. Therefore, it is made possible to output the secured printing job by interrupt processing to be described afterwards with reference to FIG. 6 and FIG. 7 and thereby to perform that job at the earliest possible opportunity.

On the other hand, since the printer 102B has only one paper discharging port, an interrupt might make it impossible to distinguish one job from another and invite selection of a wrong job, a secured print job is outputted by promote print processing, to be described afterwards with reference to FIG. 8, after the job currently being printed.

These controls make possible secured print at higher speed and avoiding selection of a wrong job.

Although references 102A and 102B denote printers in FIG. 1 by way of example, obviously there will no problem if MFPs (multi-function peripherals) having printing, copying, scanning and other functions are used in place of printers.

Also copying machines, facsimile machines or multifunctional machines having a plurality of functions including the functions of these machine can replace the laser printers 102A and 102B or, obviously printers of some other type, such as ink jet printers can be used instead.

Figure 4:
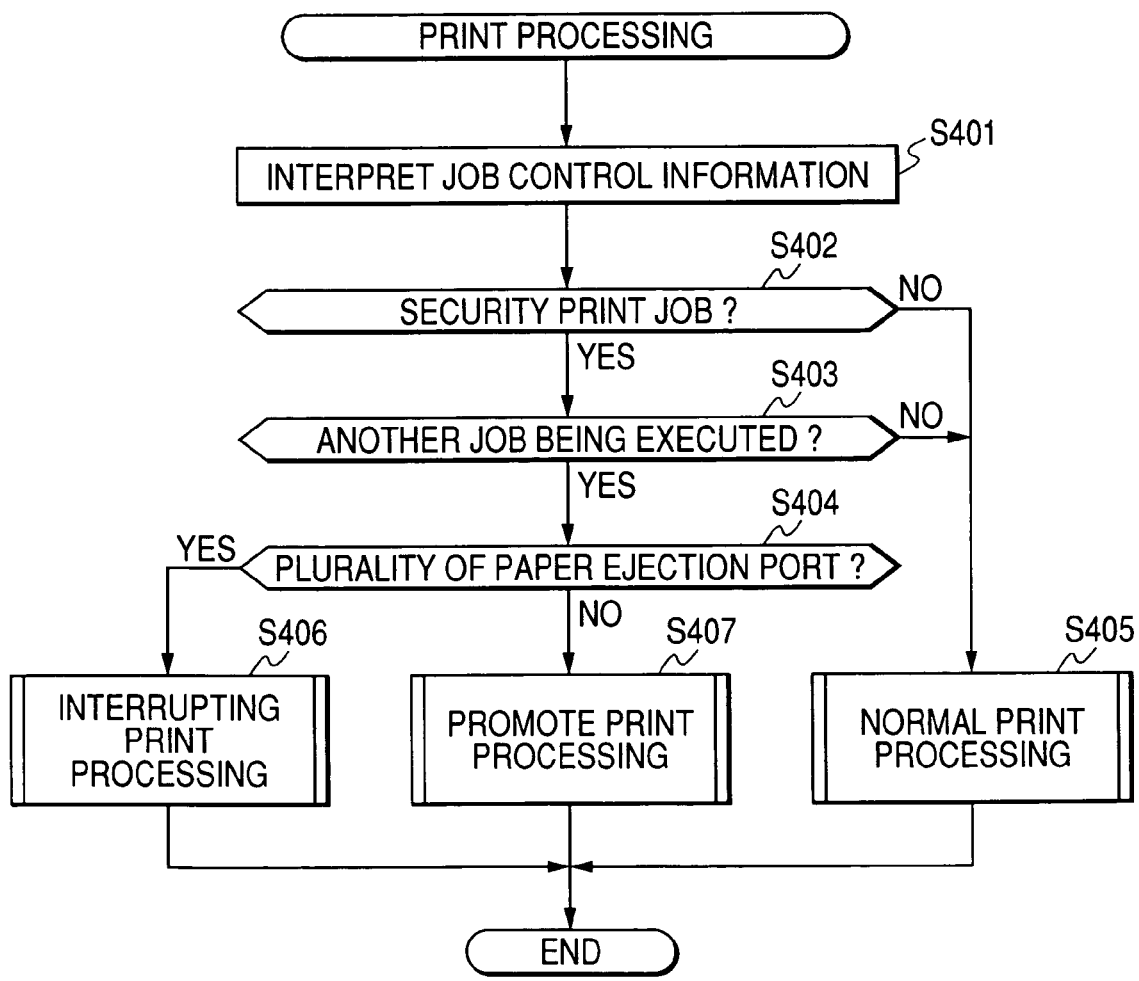
FIG. 4 is a flow chart of secured print processing executed by the laser printers in FIG. 1.

FIG. 4 is a flow chart of secured print processing executed by the laser printers 102A and 102B in FIG. 1.

Referring to FIG. 4, the printers 102A and 102B start processing triggered by a printing instruction or print data received from the panel unit 104, and interprets job control information on the received job (step S401). The job control information includes information as to whether or not the job is a secured print job in addition to such items of information as the number of copies required, job title, paper ejection mode and so forth.

When the print job to be processed at step S401 is a secured print job, the printing instruction from the panel unit 104 includes an action to input the password. As shown in FIGS. 11A, 11B, 11C and 11D, a message is displayed on an LCD 1100; selection is made of various items including the job type, user and print job with an arrow key 1101; decision is made with an execution key 1102; and on-line/off-line control is performed with an on-line key 1102.

Figure 11A:
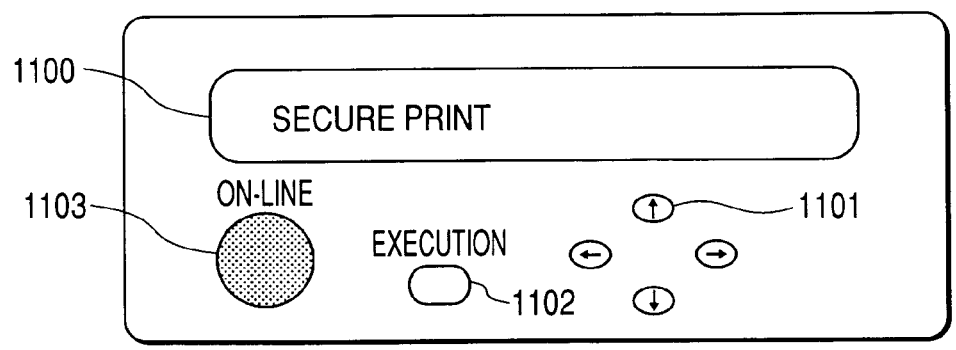
FIGS. 11A, 11B, 11C and 11D show an example of screen for inputting a password of secured print to be accomplished at step S401 of FIG. 4.
Figure 11B:
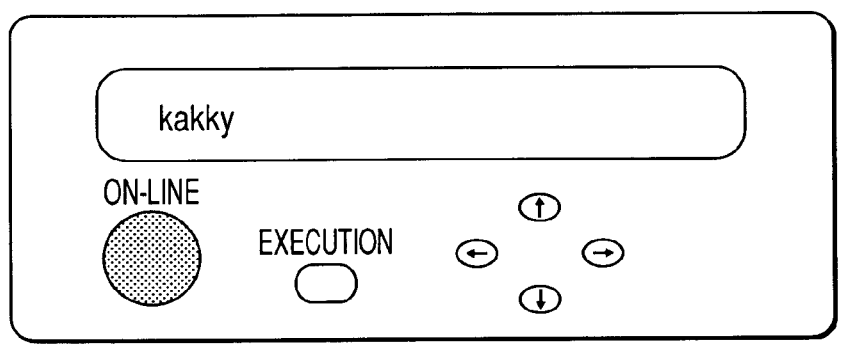
Figure 11C:
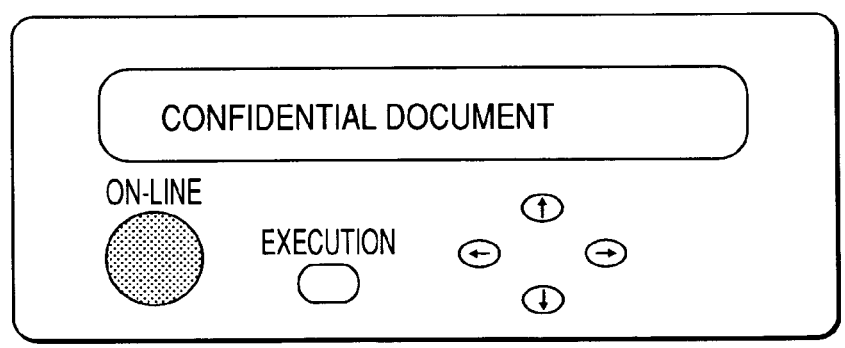
Figure 11D:
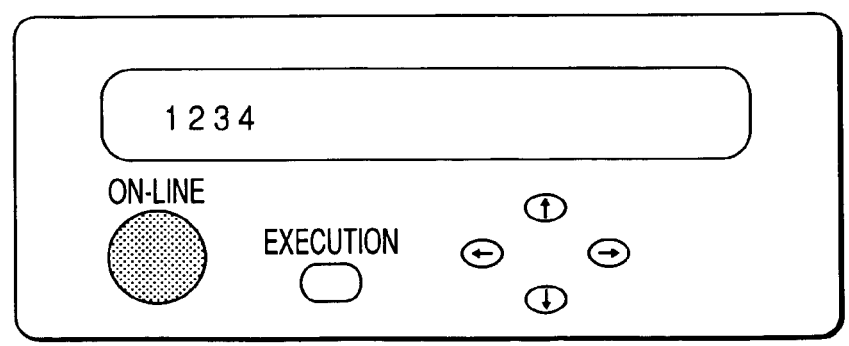

First, when the user presses down the ↑arrow key (1101), the job type is displayed. FIG. 11A shows a state in which a job type called a secure job is displayed. When the job type is selected and an execution key is pressed down, the user's name is displayed next. FIG. 11B shows a state in which a user named "kakky" is selected. Then, when the user is selected and the execution key is pressed down, the user's secure job is displayed. FIG. 11C shows a state in which a job called "confidential document" is selected. Next, when the printing job is selected and the execution key is pressed down, it is made possible to input the password. FIG. 11D shows a state in which a password "1234" is inputted. By pressing down the execution key in this state, the start of an actual print job is permitted.

On that occasion, it is conceivable either to perform the password inputting action after going off line, or to do so while staying on line.

When the password inputting action is taken after going off line, the print job being executed, if any, will be temporarily interrupted, and the execution of that print job is resumed after going out of the off-line state. Therefore, where the desired secured print job is to be processed by interrupt print processing to be described afterwards, it is possible to suspend in advance the print job being executed, and to shift to the execution of the desired secured print job correspondingly earlier. If there is no print job being executed, no new print job will not be accepted during the input of a password, and therefore the desired secured print job can be executed immediately.

On the other hand, when the password inputting action is taken while staying on line, even during the input of a password, the print job being executed, if any, will be continued. Therefore, where the desired secured print job is to be processed by promote print processing to be described afterwards, as the print job being executed is process in parallel when an action is being taken to enter the password, it is possible to shift to the execution of the desired secured print job correspondingly earlier.

Then, it is judged on the basis of the interpreted job control information whether or not the received job is a secured print job (step S402) and, if it is a secured print job, judgment will be made as to the presence or absence of another job being processed (step S403).

Figure 5:
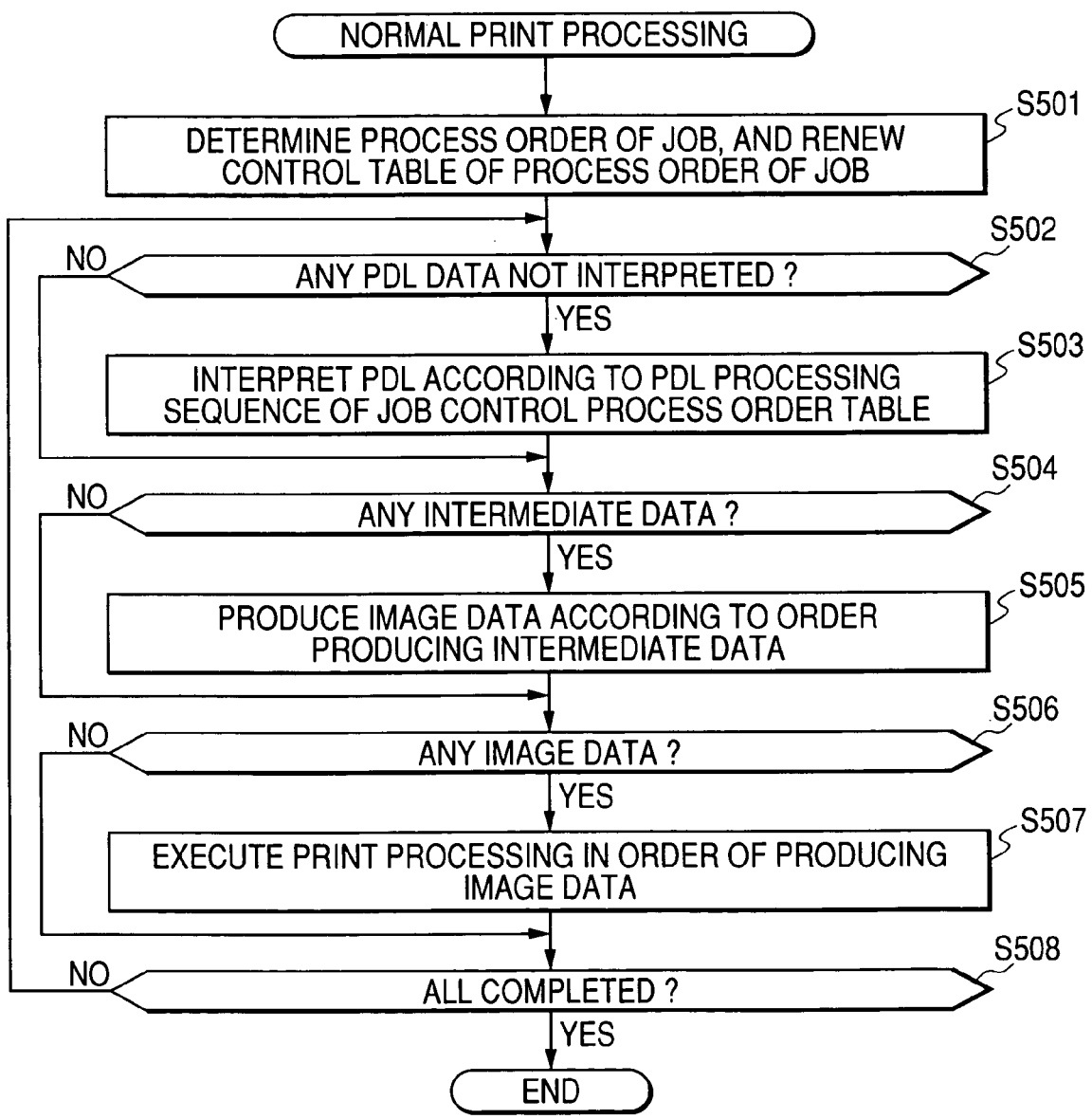
FIG. 5 is a flow chart of normal print processing executed at step S405 in FIG. 4.

If the judgment at step S402 reveals that the received job is not a secured print job or the judgment at step S403 reveals the absence of any other job being processed, normal print processing to be described afterwards with reference to FIG. 5 will be executed (step S405) to complete this processing.

Figure 6:
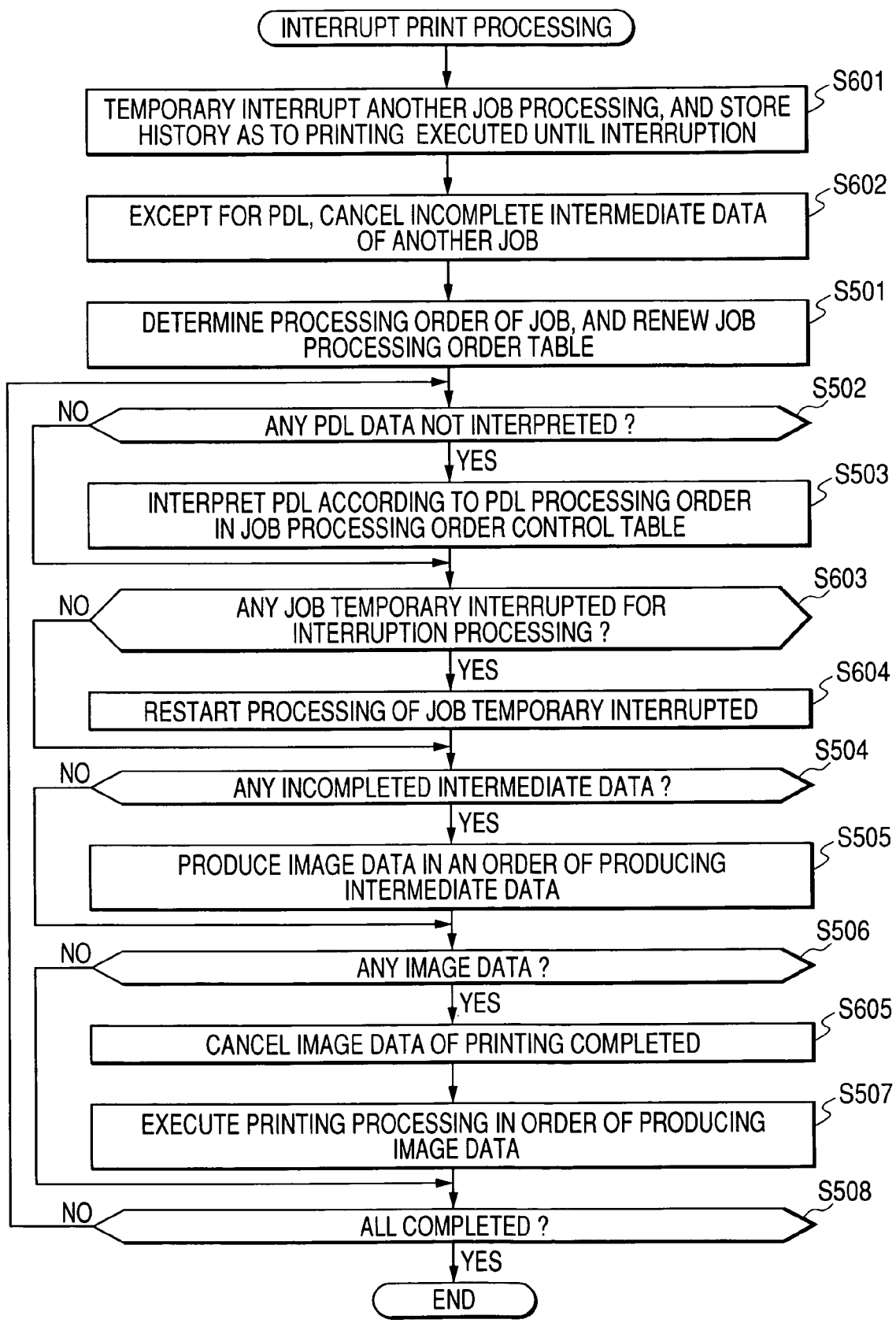
FIG. 6 is a flow chart of interrupt print processing executed at step S406 in FIG. 4.

If the judgment at step S403 reveals the presence of another job being processed, it will be further judged whether or not there are a plurality of paper discharging ports (step S404) and if there are a plurality of paper discharging ports, interrupt print processing to be described afterwards with reference to FIG. 6 will be executed (step S406) or, if there is only one paper discharging port, promote print processing to be described afterwards with reference to FIG. 8 will be executed (step S407) to complete this processing.

For a method of the acquisition of number information of paper discharging port to perform in this step S403, the CPU 309 acquires number information of paper discharging port from the print engine 105.

In addition, CPU 309 acquires model information or unit name information of a print engine from the print engine 105, and number information may be analyzed.

In the processing charted in FIG. 4, where the received job is a secured print job (YES at step S402) and there is another job being processed (YES at step S403), if there are a plurality of paper discharging ports (YES at step S404), interrupt print processing will be executed (step S406) or, if there is only one paper discharging port (NO at step S404), promote print processing will be executed (step S407). Accordingly, secured print can be made faster and more convenient.

Where a plurality of paper discharging ports are available, it is preferable to use another paper discharging port for the printing job to be processed by secured print than that for the printing job currently being processed (by a paper discharging port switching unit), and the selection of wrong printed matters can be thereby prevented. In this case, it is preferable for the other paper discharging port to be adjacent to that for the printing job being processed.

It is also permissible to switch over the paper discharging port for the printing job to be processed by secured print to a specific paper discharging port, and this would enable this printing job to be kept securely confidential. It is preferable for this paper discharging port to be an escape paper discharging tray.

FIG. 5 is a flow chart of normal print processing executed at step S405 in FIG. 4.

Referring to FIG. 5, first the order of job processing is determined from the attributes of the received data and other factors to update a job processing control table shown in FIG. 10A or FIG. 10B (step S501). The job processing control table shown in FIG. 10A or FIG. 10B is so formulated as to permit management of information on as many jobs as those being processed, and every time a job is newly inputted, one set of information is added. The order of jobs to undergo PDL processing and that of jobs to undergo print processing are managed. In the processing charted in FIG. 5, the job processing control table has the contents shown in FIG. 10A, and the order of PDL processing and that of print processing are the same. Then it is judged whether or not there are any uninterpreted PDL data (step S502), and the processing will go ahead to step S504 after generating intermediate data (step S503) by advancing PDL interpretation in accordance with the contents of the job processing control table in the order of PDL processing if there are any uninterpreted PDL data or immediately if there is none.

At step S504 that follows, it is judged whether or not there are any intermediate data to be processed, and the processing will go ahead to step S506 after generating image data in the order in which the intermediate data were generated and thereby preparing for printing (step S505) if there are any intermediate data to be processed or immediately if there is none.

Further at step S506 that follows, it is judged whether or not there are any image data to be processed, and the processing will go ahead to step S508 after performing actual printing (step S507) by advancing print processing through interaction with the engine in the order in which the image data were generated if there are image data to be processed or immediately if there are no image data to be processed. At step S508, it is judged whether or not all the printing jobs have been completed and, if not, the processing will return to step S502. Or if all the jobs have been completed, this processing will be completed.

Incidentally, the foregoing description of step S503, step S505 and step S507 supposed for the sake of convenience of description that each step was started after the preceding one was completed, different pages can as well be processed in parallel.

FIG. 6 is a flow chart of the interrupt print processing executed at step S406 in FIG. 4.

In FIG. 6, the same steps as in FIG. 5 are assigned respectively the same reference numbers.

Referring to FIG. 6, first the processing of other jobs is suspended to enable the secured print job to be processed with priority; for the job whose printing has already been started by then, the end of the already performed printing is stored (step S601) to make it recognizable the page to start with when it is to be resumed, all the intermediate data, image data and the like on the job being processed are discarded with only the PDL data saved (step S602); next the order of job processing is determined from the attributes of the received data and other factors, and the job processing control table shown in FIG. 10A or FIG. 10B is updated (step S501).

Then, it is judged whether or not there are any uninterpreted PDL data (step S502), and the processing will go ahead to step S603 after generating intermediate data (step S503) by advancing PDL interpretation in accordance with the contents of the job processing control table in the order of PDL processing if there are any uninterpreted PDL data or immediately if there is none.

Since the order of this interrupt print processing is determined by the order of the processing PDL interpretation (namely the order in which the intermediate data were generated), consideration is given so that the order can be rearranged by suspending an earlier job being processed to have the PDL interpretation of the secured print job interrupt and executing the PDL interpretation of the interrupted job.

At step S603 that follows, it is judged whether or not there is any job suspended by an interrupt, the processing will go ahead to step S504 after resuming the processing of the suspended job (step S604) if there is any or immediately if there is none.

At step S504 that follows, it is judged whether or not there are any intermediate data to be processed, and the processing will go ahead to step S506 after generating image data in the order in which the intermediate data were generated and thereby preparing for printing (step S505) if there are any intermediate-data to be processed or immediately if there is none.

Further at step S506 that follows, it is judged whether or not there are any image data to be processed, and the processing will go ahead to step S508 after discarding the printed image data (step S605) on the basis of the number of printed pages stored at step S601 and performing actual printing (step S507) by advancing print processing through interaction with the engine in the order in which the image data were generated if there are image data to be processed or immediately if there are no image data to be processed. At step 508, it is judged whether or not all the printing jobs have been completed and, if not, the processing will return to step S502. Or if all the jobs have been completed, this processing will be completed.

The method of not printing again the already printed pages described with reference to step S605 may as well be realized by processing to skip the reading of pertinent PDL data at step S503 on the basis of the number of printed pages stored at step S601.

FIG. 7 is a flow chart of a variation of the interrupt print processing charted in FIG. 6.

Referring to FIG. 7, first the processing of the job for which paper feeding is already started is suspended at step S901, then the order of job processing is determined from the attributes of the received data and other factors, and the job processing control tables shown in FIGS. 10A and 10B are updated (step S501). The job processing control tables shown in FIGS. 10A and 10B are so formulated as to permit management of information on as many jobs as those being processed, and every time a job is newly inputted, one set of information is added. The order of jobs to undergo PDL processing and that of jobs to undergo print processing are managed. In the processing charted in FIG. 5, the job processing control table has the contents shown in FIG. 10A, and the order of PDL processing and that of print processing are the same. Then it is judged whether or not there are any uninterpreted PDL data (step S502), and the processing will go ahead to step S504 after generating intermediate data (step S503) by advancing PDL interpretation in accordance with the contents of the job processing control table in the order of PDL processing if there are any uninterpreted PDL data or immediately if there is none.

At step S504 that follows, it is judged whether or not there are any intermediate data to be processed, and the processing will go ahead to step S506 after generating image data in the order in which the intermediate data were generated and thereby preparing for printing (step S505) if there are intermediate data to be processed or immediately if there is none.

Further at step S506 that follows, it is judged whether or not there are any image data to be processed, and the processing will go ahead to step S508 after performing actual printing (step S702) by advancing print processing through interaction with the engine in accordance with information on the order of print processing in the job processing control table shown in FIG. 10B, for instance, if there are image data to be processed or immediately if there are no image data to be processed. At step 508, it is judged whether or not all the printing jobs have been completed and, if not, the processing will return to step S502. Or if all the jobs have been completed, this processing will be completed.

Where secured print with emphasis on security is to interrupt and to be processed as described above, the secured print job is enabled to be processed even faster by passing otherwise prior jobs in the processing order without discarding other printing jobs.

FIG. 8 is a flow chart of promote print processing executed at step S407 in FIG. 4.

In FIG. 8, the same steps as in FIG. 5 are assigned respectively the same reference numbers.

Referring to FIG. 8, first, marking is done not to let paper feed be started for any job for which paper feed has not yet been started (step S701), and then the order of job processing is determined from the attributes of the received data and other factors to update a job processing control table shown in FIG. 10A or FIG. 10B (step S501). The job processing control table shown in FIG. 10A or FIG. 10B is so formulated as to permit management of information on as many jobs as those being processed, and every time a job is newly inputted, one set of information is added. The order of jobs to undergo PDL processing and that of jobs to undergo print processing are managed. In the processing charted in FIG. 8, the job processing control table has the contents shown in FIG. 10A, and the order of PDL processing and that of print processing are the same. Then it is judged whether or not there are any uninterpreted PDL data (step S502), and the processing will go ahead to step S504 after generating intermediate data (step S503) by advancing PDL interpretation in accordance with the contents of the job processing control table in the order of PDL processing if there are any uninterpreted PDL data or immediately if there is none.

At step S504 that follows, it is judged whether or not there are any intermediate data to be processed, and the processing will go ahead to step S506 after generating image data in the order in which the intermediate data were generated and thereby preparing for printing (step S505) if there are any intermediate data to be processed or immediately if there is none.

Further at step S506 that follows, it is judged whether or not there are any image data to be processed, and the processing will go ahead to step S508 after performing actual printing (step S702) by advancing print processing through interaction with the engine in accordance with information on the order of print processing in the job processing control table shown in FIG. 10B, for instance, if there are image data to be processed or immediately if there are no image data to be processed. At step 508, it is judged whether or not all the printing jobs have been completed and, if not, the processing will return to step S502. Or if all the jobs have been completed, this processing will be completed.

As described above, secured print with emphasis on security, even where there is another printing job or jobs, can be enhanced in convenience by being processed with as high priority as practicable while avoiding the mixed loading of jobs even in an environment where a plurality of users share one printing apparatus.

FIG. 9 is a flow chart of a variation of the interrupt print processing charted in FIG. 4.

As the process charted in FIG. 9 is basically the same as that in FIG. 4, the same steps as in FIG. 4 are assigned respectively the same reference signs, and duplication of description is avoided. The following description concerns only the parts different from FIG. 4.

While whether to give priority to a secured print job by interrupt or promote is decided according to the presence or absence of a plurality of paper discharging ports in the print processing charted in FIG. 4, in the way of processing charted here the quantity of paper sheets loaded-behind each paper discharging port is detected and priority is differentiated according to whether or not there is an empty paper discharging port (not in use or not planned for use) behind which no paper is loaded.

Referring to FIG. 9, the printers 102A and 102B start processing triggered by a printing instruction or print data received from the panel unit 104, and interpret job control information on the received job (step S401). If the received job is a secured print job (YES at step S402) and there is any other job being processed (YES at step S403), the quantity of paper sheets loaded behind each paper discharging port is detected to judge whether or not there is an empty paper discharging port (not in use or not planned for use) behind which no paper is loaded (step S801).

If the judgment at step S801 reveals the presence of an empty paper discharging port, the interrupt print processing charted in FIG. 6 will be executed (step S406), of if there is no empty port, the promote print processing charted in FIG. 8 will be executed (step S407) to complete this processing.

The processing charted in FIG. 9 can be dynamically varied, interlocked with the loaded states of the paper discharging ports by differentiation according to the loaded states of the paper discharging ports, thereby making possible faster secured print and avoidance of mixed loading.

While the processing charted in FIG. 4 involves the interrupt print processing (step S406) in which what has already started is once discarded and processed again after letting the secured print job interrupt, this processing can be made independent of the order of PDL interpretation as shown in the job processing control table of FIG. 10B and enabled to control the order of printing, so that interrupt print processing is realized by merely altering the order of print processing.

In the processing shown in FIG. 9, the arrangement is such that it is judged at step S403 whether or not there is any other job being processed and, if there is any, the loaded quantities of paper sheets behind paper discharging ports will be detected at step S801 to find out whether or not there is any empty paper discharging port. However, it is also conceivable to judge at step S404 whether or not there are a plurality of paper discharging ports and, if there are, to make the judgment of step S801 or, if there is no empty paper discharging port, to execute promote print processing (step S407).

(Other Embodiments)

While the preferred embodiment of the present invention has been described in detail so far, the invention may be applied to a system consisting of a plurality of devices or to an apparatus consisting of a single apparatus.

The object of the invention can also be achieved by supplying either directly or remotely a program to realize the functions of the above-described embodiment to a system or an apparatus and thereby causing the system or the apparatus to read the supplied program codes and to execute the program. Therefore, the program codes installed in a computer to have the functions according to the invention be performed by the computer are in themselves also included in the technical scope of the invention.

The foregoing applies to a program in any form only if it has functions of a program, be it object codes, a program to be executed by an interpreter, script data to be supplied to an OS or anything else.

Recording media useable for supplying a program include, for instance, a floppy (registered trademark) disk, hard disk, optical disk, magneto-optical disk, MO, CD-ROM, CD-R, CD-RW, magnetic tape, nonvolatile memory card, ROM, and DVD (DVD-ROM or DVD-R).

Other available methods for supplying the program include one by which the computer program according to the invention, which may be the program itself or a compressed file containing an automatic installing function, is downloaded to a recording medium, such as a hard disk, from a website on the Internet, to which connection is made by using the browser of the client computer. The supply of the program can as well be realized by dividing the program codes constituting the program according to the invention into a plurality of files and downloading each individual file from a different website. Thus, a www server for enabling a plurality of users to download program files for realizing the process of the functions of the inventor on a computer is also included in the scope of claims of the invention.

It is also possible to encrypt the program according to the invention, store the encrypted program on CD-ROMs or some other recording media, distribute the media to users, and allow users satisfying prescribed requirements to download key information for decryption from a website via the Internet and execute the encrypted program by using the key information to install it on their respective computers.

Besides realizing the functions of the above-described embodiment by having a computer executed the read-out program, the functions can also be realized by having, in accordance with an instruction of the program, the OS or the like operating on the computer execute part or the whole of the actual processing.

Further, after the program read out of the recording medium is written into a memory provided on a functional extension board inserted into the computer or a functional extension unit connected to the computer, it is also possible to have the CPU or the like provided on the functional extension board or the functional extension unit execute part or the whole of the actual processing thereby to realize the functions of the above-described embodiment.

The foregoing configuration, since it is determined whether or not a given printing job is a secured print job and the printing job to be processed by secured print is given priority in the order of print processing over other printing jobs than the secured print job, secured print can be made faster and more convenient.

Further, where there are a plurality of paper discharging ports and any other printing job than a printing job to be processed by secured print is being processed, as the processing of the printing job under way is suspended and the paper discharging port for the printing job to be processed by secured print is switched over to another port than that for the printing job underway, selection of wrong printed matters can be prevented.

Also, as a paper discharging port not in use or not scheduled for use out of the plurality of paper discharging ports is allocated for the printing job to be processed by secured print, secured print can be accomplished at higher speed and mixed loading can be avoided.

Furthermore, the paper discharging port for the printing job to be kept confidential is switched over to a specific port, the confidentiality of the printing job can be secured without fail.

On the other hand, where only one paper discharging port is provided and another printing job than the printing job to be processed by secured print is being processed, the printing job to be processed by secured print is processed after the printing job under way is completed. Therefore, faster secured print can be further ensured while preventing selection of wrong printed matters.

The present application claims priority from Japanese Patent Application Laid-Open No. 2004-216249, which are incorporated herein by reference.

As many apparently widely different embodiments of the present invention can be made without departing from the spirit and scope thereof, it is to be understood that the invention is not limited to the specific embodiments thereof except as defined in the appended claims.

This application claims priority from Japanese Patent Application No. 2004-216249 filed Jul. 23, 2004, which is hereby incorporated by reference herein.

What is claimed is:

1. A printing apparatus which prints on a sheet and outputs the sheet to a sheet stacking unit among a plurality of sheet stacking units, comprising:
an executing unit configured to execute a secure print job requiring a password before an execution of the secure print job and a non-secure print job not requiring a password before an execution of the non-secure print job;
a determining unit configured to determine whether there is a sheet stacking unit on which a sheet is not stacked among the plurality of sheet stacking units;
a control unit configured to, in a case where the execution of the secure print job is instructed when the non-secure print job is being executed, interrupt the execution of the non-secure print job and execute the secure print job while the non-secure print job is interrupted if the determining unit determines there is the sheet stacking unit on which a sheet is not stacked; and
an output control unit configured to change an output destination of a sheet corresponding to the secure print job for preventing the sheet corresponding to the secure print job from being output to a sheet stacking unit to which a sheet corresponding to the non-secure print job is output,
wherein the control unit, in a case where the execution of the secure print job is instructed when the non-secure print job is being executed, executes the secure print job after completion of the execution of the non-secure print job without interrupting the execution of the non-secure print job if the determining unit determines that there is not the sheet stacking unit on which a sheet is not stacked.

2. The printing apparatus according to claim 1, wherein the execution of the secure print job is instructed by input of the password required to execute the secure print job.

3. The printing apparatus according to claim 1, wherein the determining unit determines that there is a sheet stacking unit to which no sheet is set to output, and
wherein the output control unit changes the output destination of the sheet corresponding to the secure print job to the sheet stacking unit to which no sheet is set to output.

4. The printing apparatus according to claim 1, wherein the output control unit changes the output destination of the sheet corresponding to the secure print job to the sheet stacking unit being adjacent to the sheet stacking unit to which a sheet corresponding to the non-secure print job is output.

5. The printing apparatus according to claim 2, wherein the output control unit changes the output destination of the secure print job to a specific sheet stacking unit among the plurality of sheet stacking units.

6. The printing apparatus according to claim 5, wherein the specific sheet stacking unit is an escape paper discharging tray.

7. A printing method for a printing apparatus which prints on a sheet and outputs the sheet to a sheet stacking unit among a plurality of sheet stacking units, the method comprising:
an executing step of executing a secure print job requiring a password before an execution of the secure print job and a non-secure print job not requiring a password before an execution of the non-secure print job;
a determining step of determining whether there is a sheet stacking unit on which a sheet is not stacked among the plurality of sheet stacking units;
a control step of, in a case where the execution of the secure print job is instructed when the non-secure print job is being executed, interrupting the execution of the non-secure print job and executing the secure print job while the non-secure print job is interrupted if it is determined in the determining step that there is the sheet stacking unit on which a sheet is not stacked; and an output control step of changing a sheet corresponding to the secure print job for preventing the sheet corresponding to the secure print job from being output to a sheet stacking unit to which a sheet corresponding to the non-secure print job is output, wherein the control step, in a case where the execution of the secure print job is instructed when the non-secure print job is being executed, includes executing the secure print job after completion of the execution of the non-secure print job without interrupting the execution of the non-secure print job if it is determined in the determining step that there is not the sheet stacking unit on which a sheet is not stacked.

8. The printing method according to claim 7, wherein the execution of the secure print job is instructed by input of the password required to execute the secure print job.

9. The printing method according to claim 7, further comprising:
a second determining step of determining that there is a sheet stacking unit to which no sheet is set to output, and
wherein the output destination of the sheet corresponding to the secure print job is changed to the sheet stacking unit to which no sheet is set to output.

10. The printing method according to claim 7, wherein the output control step includes changing the output destination of the sheet corresponding to the secure print job to the sheet stacking unit being adjacent to the sheet stacking unit to which a sheet corresponding to the non-secure print job is output.

11. The printing method according to claim 7, wherein the output destination of the secure print job to a specific sheet stacking unit among the plurality of sheet stacking units is changed.

12. The printing method according to claim 11, wherein the specific sheet stacking unit is an escape paper discharging tray.

13. A non-transitory computer-readable storage medium storing a computer program executable by a computer for controlling a printing apparatus which prints on a sheet and outputs the sheet to a sheet stacking unit among a plurality of sheet feeding units, the computer program comprising:
an executing module for executing a secure print job requiring a password before an execution of the secure print job and a non-secure print job not requiring a password before an execution of the non-secure print job;
a determining module for determining whether there is a sheet stacking unit on which a sheet is not stacked among the plurality of sheet stacking units;
a control module for, in a case where the execution of the secure print job is instructed when the non-secure print job is being executed, interrupting the execution of the non-secure print job and execute the secure print job while the non-secure print job is interrupted if the determining module determines that there is the sheet stacking unit on which a sheet is not stacked; and an outputting control module for changing an output destination of a sheet corresponding to the secure print job for preventing the sheet corresponding to the secure print job from being output to a sheet stacking unit to which a sheet corresponding to the non-secure print job is output, wherein the control module, in a case where the execution of the secure print job is instructed when the non-secure print job is being executed, executes the secure print job after completion of the execution of the non-secure print job without interrupting the execution of the non-secure print job if the determining module determines that there is not the sheet stacking unit on which a sheet is not stacked.

14. The printing apparatus according to claim 1, further comprising
a user information receiving unit configured to receive user information from a user; and
a password receiving unit configured to receive a password from the user,
wherein the execution of the secure print job is instructed by receiving the user information and the password.

15. A printing apparatus which prints on a sheet and outputs the sheet to a sheet stacking unit among a plurality of sheet stacking units, comprising:
an executing unit configured to execute a secure print job requiring a password before an execution of the secure print job and a non-secure print job not requiring a password before an execution of the non-secure print job;
a determining unit configured to determine whether there is a sheet stacking unit on which a sheet is not stacked among the plurality of sheet stacking units;
a control unit configured to, in a case where the execution of the secure print job is instructed when the non-secure print job is being executed, interrupt the execution of the non-secure print job and execute the secure print job while the non-secure print job is interrupted if the determining unit determines that there is the sheet stacking unit on which a sheet is not stacked; and
an output control unit configured to change an output destination of a sheet corresponding to the secure print job to a predetermined tray different from an output destination of a sheet corresponding to the non-secure print job,
wherein the control unit, in a case where the execution of the secure print job is instructed when the non-secure print job is being executed, executes the secure print job after completion of the execution of the non-secure print job without interrupting the execution of the non-secure print job if the determining unit determines that there is not the sheet stacking unit on which a sheet is not stacked.

* * * * *